(12) United States Patent
Chakraborty et al.

(10) Patent No.: US 10,657,109 B1
(45) Date of Patent: May 19, 2020

(54) METHOD AND SYSTEM FOR SHAREPOINT BACKUP FOR DISASTER RESTORE

(71) Applicant: EMC Corporation, Hopkinton, MA (US)

(72) Inventors: Anupam Chakraborty, Bangalore (IN); Pradeep Anappa, Bangalore (IN); Tushar Dethe, Nagpur (IN); Sunil K. Yadav, Bangalore (IN); Amarendra Behera, Bangalore (IN); Manjesh V. Chikkanayakanahally, Bangalore (IN); DharmaTeja Challa, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 667 days.

(21) Appl. No.: 14/142,501

(22) Filed: Dec. 27, 2013

(51) Int. Cl.
 G06F 16/21 (2019.01)
(52) U.S. Cl.
 CPC .................... *G06F 16/21* (2019.01)
(58) Field of Classification Search
 CPC ............ G06F 11/1469; G06F 11/1448; G06F 11/1458; G06G 16/21
 USPC ........................................................ 707/654
 See application file for complete search history.

(56) References Cited

U.S. PATENT DOCUMENTS

| | | | | |
|---|---|---|---|---|
| 7,356,559 | B1* | 4/2008 | Jacobs ..................... | G06F 8/34 707/999.01 |
| 7,478,117 | B1* | 1/2009 | Lamb .................. | G06F 11/1466 |
| 8,244,678 | B1* | 8/2012 | Hartland ............. | H04L 67/1095 707/610 |
| 8,732,128 | B2* | 5/2014 | Wang ................... | G06F 11/1448 707/639 |
| 8,738,585 | B2* | 5/2014 | Abraham ............ | G06F 11/1469 707/679 |
| 8,832,030 | B1* | 9/2014 | Buchman ............ | G06F 11/1451 707/650 |
| 9,110,837 | B2* | 8/2015 | Patel ................... | G06F 11/1453 |
| 2004/0107199 | A1* | 6/2004 | Dalrymple, III ..... | G06F 11/1451 |
| 2008/0147621 | A1* | 6/2008 | Newman ............. | G06F 11/1464 |
| 2009/0276591 | A1* | 11/2009 | Mu ..................... | G06F 11/1464 711/162 |

(Continued)

OTHER PUBLICATIONS

EMC, EMC NetWorker Module for Microsoft Applications Release 2.4 Administration Guide, Sep. 28, 2012.*

(Continued)

*Primary Examiner* — Grace Park
*Assistant Examiner* — Kurt A Mueller
(74) *Attorney, Agent, or Firm* — Womble Bond Dickinson (US) LLP

(57) ABSTRACT

A method is provided for backing up and restoring a web applications platform. The method includes backing up web applications platform databases to a backup system. A search index of the web application platform is backed up. An application programming interface (API) is queried to discover internet information services (IIS) virtual directories associated with the web applications platform. Discovered IIS virtual directories associated with the web applications platform are backed up to the backup system. IIS configuration data, IIS metabase data and registry data for the web applications platform are then backed up to the backup system. A similar process enables the restoration of this data to allow for disaster recovery for the web applications platform.

6 Claims, 2 Drawing Sheets

(56) References Cited

U.S. PATENT DOCUMENTS

| | | | |
|---|---|---|---|
| 2010/0082553 A1* | 4/2010 | Beatty | G06F 11/1469 |
| | | | 707/679 |
| 2010/0318782 A1* | 12/2010 | Auradkar | G06F 11/1451 |
| | | | 713/150 |
| 2011/0167221 A1* | 7/2011 | Pangal | G06F 11/1453 |
| | | | 711/117 |
| 2014/0082166 A1* | 3/2014 | Robinson | G06F 9/5072 |
| | | | 709/223 |
| 2014/0181041 A1* | 6/2014 | Whitehead | G06F 11/1448 |
| | | | 707/652 |
| 2014/0201152 A1* | 7/2014 | Kumarasamy | G06F 11/1469 |
| | | | 707/647 |
| 2014/0201157 A1* | 7/2014 | Pawar | G06F 17/30289 |
| | | | 707/654 |
| 2015/0205968 A1* | 7/2015 | Aiello | G06F 12/1408 |
| | | | 713/193 |
| 2018/0285215 A1* | 10/2018 | Ashraf | G06F 11/1469 |

OTHER PUBLICATIONS

EMC, EMC NetWorker Module for Microsoft Applications Release 2.4 Installation Guide, Oct. 15, 2012.*

Unknown, Dell EMC Networker Module for Microsoft for SQL and Sharepoint VSS, Dell EMC (Year: 2017).*

Unknown, EMC NetWorker Module for Microsoft Applications, EMC Corporation (Year: 2011).*

Unknown, EMC NetWorker Module for Microsoft Applications, EMC Corproation (Year: 2011).*

* cited by examiner

US 10,657,109 B1

METHOD AND SYSTEM FOR SHAREPOINT BACKUP FOR DISASTER RESTORE

FIELD

The embodiments relate to the management of to the backup and restoration of date from a web applications platform or content management server such as a SharePoint server. In particular, the embodiments enable the backing up of Internet information services and registry data from a SharePoint server to a backup system.

BACKGROUND

Web application platforms include a set of web technologies and a common technical infrastructure. These web technologies are designed to be utilized by non-technical users and can provide intranet portals, document and file management, collaboration tools, social networks, enterprise search and business intelligence features. The web application platform can also support system integration, process integration and workflow automation capabilities. The web application platform can provide a complete development stack based on the web technologies and standards based application programing interfaces (APIs).

On example of a web application platform is SharePoint by Microsoft Corporation of Redmond, Wash. Web application platforms such as SharePoint can provide flexible service-oriented architecture (SOA) that can be scaled to operate from a single server or up to hundreds of machines. The web application platform supports the execution of web applications. Web applications are top-level containers for content in a web application platform such as SharePoint. Web applications operate independent of one another and can be restarted independently.

Service applications are also supported by web application platforms. Service applications provide granular functionality to other web and service application in the web application platform. Service applications can include such functions as search indexing services. A service application can exist on a single server or can be load-balanced over a set of servers in the web application platform. Service application are designed to operate independently and can be restarted and similarly independently operate.

Many companies and individuals with large amounts of stored data in their web application platform employ a backup storage system. These backup storage systems can be located local to the data to be backed up or at a remote site. The backup storage systems can be managed by the entity controlling the backup storage devices or a backup storage service company. Data can be added to the storage system at any frequency and at any amount. However, due to the complicated architecture of web application platforms, not all data is easily accessed and backed up.

BRIEF DESCRIPTION OF THE SEVERAL VIEWS OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
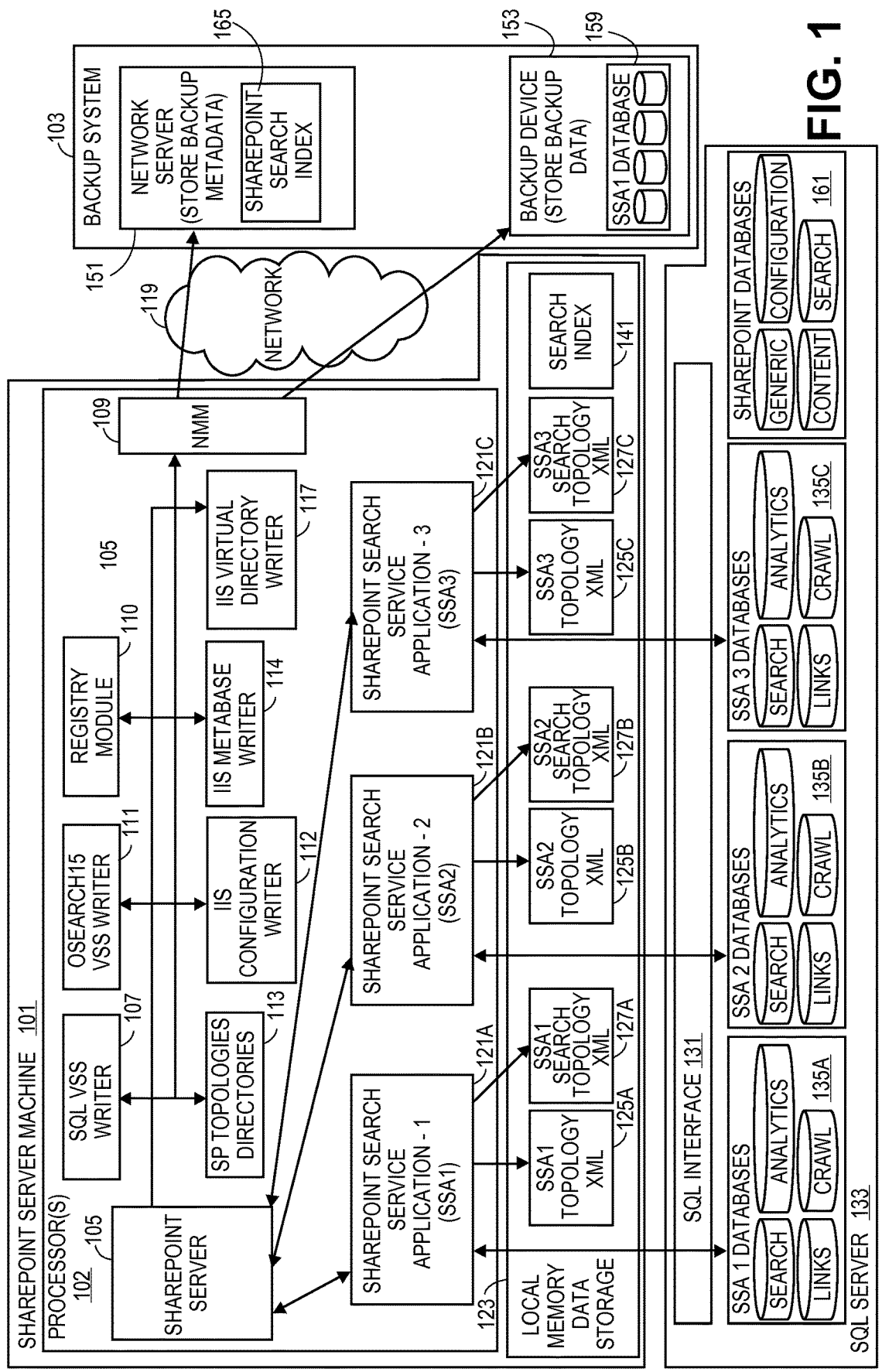
FIG. 1 is a block diagram of a web application platform server in communication with a backup system.

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description, numerous specific details are set forth, such as virtual tape functions, virtual tape state information, virtual tape library history management, orders of operations in flowcharts, component execution details, and similar specific details related to embodiments of the invention. However, it is understood that embodiments of the invention may be practiced without these specific details. In other instances, well-known circuits, structures and techniques have not been shown in detail in order not to obscure the understanding of this description.

Overview

In one embodiment, a backup system is provided to backup data from a web application platform. For example, the backup system can be the NetWork Module for Microsoft Application (NMM) by EMC of Hopkinton, Mass. The NMM is a backup system for backing up data from a SharePoint Server by using the writers of the SharePoint Server. These writers are modules of the SharePoint Server that manage different aspects of the data maintained by the SharePoint Server. The example embodiment of a NMM being used to back up a SharePoint Server is provided herein by way of example. However, one skilled in the art would understand that the processes and principles described herein are applicable to other types of backup systems and web application platforms.

In particular the embodiments related to the backup of data by the NMM using the SharePoint volume shadow copy service (VSS) writer. The SharePoint Server VSS writer is a referential writer that is dependent on the structured query language (SQL) server VSS writer and SharePoint search writer.

The SharePoint server can be set up as a single server machine or in a farm configuration which is a set of server machines providing a distributed support of the SharePoint server. The SharePoint VSS writer can service requests to provide a list of all server machines, databases and files associated with the farm. This list is provided to a requesting application such that a backup process can be executed on the location where the identified databases are physically located. However, the SharePoint VSS writer does not report the IIS configuration data, which in some embodiments is primarily in an application host.config file. This file must be backed up and restored separately. The backup process performs an IIS virtual directory discovery of the web applications supported by the SharePoint server using the SharePoint APIs. The IIS virtual directories writer can then be utilized to back up the IIS directories. To complete the farm backup, the IIS configuration writer, IIS metabase writer and the registry module must also be backed up and restored during any disaster or failure recovery process to make the SharePoint farm fully operational.

FIG. 1 is a block diagram of a web application management server in communication with a backup system. In the illustrated embodiment, the web application management server is a SharePoint Server. 105. The Sharepoint server is executed by a SharePoint server machine 101. The SharePoint server machine 101 can be a dedicated server, a workstation, desktop computer, or similar computing device. In other embodiments, the SharePoint server 105 can be implemented in a distributed environment including a cloud computing environment where the any number of SharePoint server machines 101 can execute the SharePoint server 105. In any given SharePoint server machine 101 a set of processors can execute the SharePoint server 105, NMM 109 and associated modules. A 'set,' as used herein is any positive whole number of items including one item.

The SharePoint server machine 101 can also include a set of local data storage devices 123. The local data storage devices 123 can be dynamic or static random access memory or similar data storage devices. The local data storage devices 123 can also include persistent storage devices including magnetic or optical drives, solid state drives or similar persistent storage devices. The local storage devices 123 can store code of the modules executed by the processors 105 including the SharePoint Server 141, SharePoint Search Service Applications (SSAs) 121A-C, the NMM 109 and other modules.

The SharePoint server machine 101 can include a network interface (not shown) for communicating with other computing devices including a backup system 103, a SQL server 133, other SharePoint server machines and similar devices. The SharePoint Server machine 101 can communicate with other devices through direct links or via a network 119. The network 119 can be any type of network including a wired or wireless network or combination thereof. The network can be a local area network (LAN) or wide area network (WAN) including private or public networks such as the Internet.

The SharePoint server 105 is a web application management server enabling the execution of web applications such as the SSAs 121A-C that can provide functionality to a set of client computers over the network 119 (not shown). The SharePoint server 105 can manage the resources, creation and similar aspects of the SSA 121A-C. Any number of SSA 121A-C can be supported by the SharePoint Server 105 on the SharePoint server machine 101 or over a set of SharePoint server machines. The SharePoint server 105 can operate in conjunction with a set of modules that provide related functions including a SQL VSS writer 107, SP Topologies Directories module 113, the OSEARCH15 VSS writer 111, a set of SharePoint APIs 115, an Internet Information Services (IIS) directory writer 117 and similar modules.

The SQL VSS writer 107 is a module that enables access to the SQL databases for SharePoint 161 including configuration, content, generic and search databases. The SQL databases can also include those maintained by the SSAs as discussed herein below. The SP topologies directories module 113 maintains topology information related to the SSAs including the SSA topology XML files. The OSEARCH15 VSS writer 111 manages search index information stored in the search index 141. The SharePoint APIs 115 provide access to SharePoint server 105 and SSA 121A-C functionality to external applications such as backup software including NMM 109. The IIS directory writer 117 manages the IIS directory information for the SharePoint server 105.

In one embodiment, the SharePoint server 105 supports a set of SSAs 121A-C that provide a range of functions and features to any number of client computers or applications or to other SSAs. Each SSA 121A-C utilizes a set of data structures and databases to manage data associated with its functionality. The data structures can include SSA topology XML files 125A-C and the SSA search topology XML files 127A-C. The SSA topology XML files 125A-C track the location of relevant content and data utilized by the SSA and the SSA search topology XML tracks information related to searches associated with the SSA including searches of the SSA databases.

Each SSA 121A-C utilizes a set of databases 135A-C to store relevant data that are managed and stored by a database management system such as an SQL server 133. The SQL server 133 can be local or remote from the SharePoint Server machine 101. The SQL server 133 includes an SQL interface to receive and respond to queries from application such as the SSA 121A-C. The databases of the SSA 121A-C include a search or search administration database, an analytics reporting database, a crawling database and a link database. The search database hosts the search service application configuration and access control list for the crawl database. The analytics reporting database stores the results for usage analysis reports and extracts information from the link database. The crawl database stores the state of the crawled data and the crawl history of the SSA. The link database stores the information that is extracted by the content processing and click through information of the SSA.

The NMM 109 performs backup and restore operations for the SharePoint 105 server. The NMM 109 can back up the necessary information for restoring the SharePoint server as set forth herein below with regard to FIG. 2 and FIG. 3. The NMM 109 can back up the data to a local or remote backup system 103. The backup system can be any backup system including backup systems that provide deduplication and similar data compression and related services.

In one embodiment, the backup system 103 is remotely located and administered over a network 119 such as a WAN. In other embodiments, the backup system 103 is locally located and administered over a LAN or a WAN. The backup system 103 can have any organization or functionality capable of receiving the SharePoint backup information and retrieving the same information for disaster or failure recovery restoration processes. In one example embodiment, the backup system 103 includes a network server 151 and a set of backup devices 153. The network server 151 can store metadata related to the SharePoint server 105 including indexing data. The set of backup devices 153 can store each of the databases of the SharePoint server including the generic, configuration, content and search databases.

Figure 2:
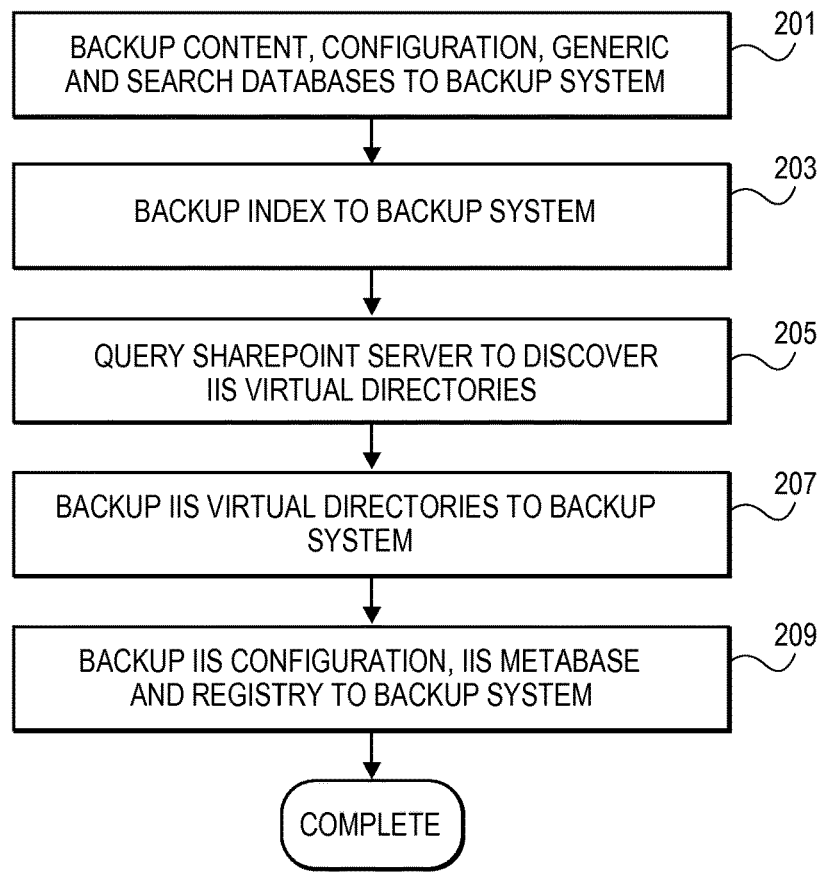
FIG. 2 is a flowchart of one embodiment of a backup process for a web application platform server.

FIG. 2 is a flowchart of one embodiment of a backup process for the web application server. In one embodiment, the backup process can be initiated by the NMM at any point during the operation of the SharePoint server. The backup process can be scheduled at regular intervals, initiated in response to any change in the SharePoint server or based on any trigger defined by an administrator. The backup process is described as it relates to the backing up of the SharePoint server. One skilled in the art would understand that the backup process can also handle the backing up of other SharePoint related data.

As used herein, 'backing up' data involves the reliable copying and transfer of the data from the SharePoint server machine to the backup system without affecting (i.e., without deleting or corrupting the data being backed up). In one embodiment, the metadata that is backed up is stored in the network server, whereas other data is stored in the backup devices.

The process can begin by backing up the SharePoint databases to the backup system (Block 201). The databases can be accessed by the NMM via the SQL VSS writer or similar component that enables the SQL databases associated with the SharePoint server to be retrieved and backed up to the backup system. The backed up databases can include the search database, generic database, configuration database and content database of the SharePoint server.

The process can then backup the index of the SharePoint server (Block 203). This index can be accessed by the NMM via the OSEARCH15 VSS writer. The index can be backed up to the network server or similar location in the backup system.

The backup process for the SharePoint server can then continue by querying the SharePoint APIs to determine the IIS virtual directories associated with the SharePoint server (Block 205). Once the NMM receives the IIS virtual directory information, the NMM can use the IIS virtual directory writer to back up the IIS virtual directories to the backup system (Block 207). Along with the backup of the IIS virtual directories the NMM utilizes the IIS configuration writer, IIS metabase writer, and the registry module to back up the IIS configuration data, IIS metabase data and the registry data associated with the SSA, respectively (Block 209). In further embodiments, any additional data related to a SharePoint server and requisite for restoring the SharePoint server can also be backed up by the NMM using an associated SharePoint module to the backup system.

Figure 3:
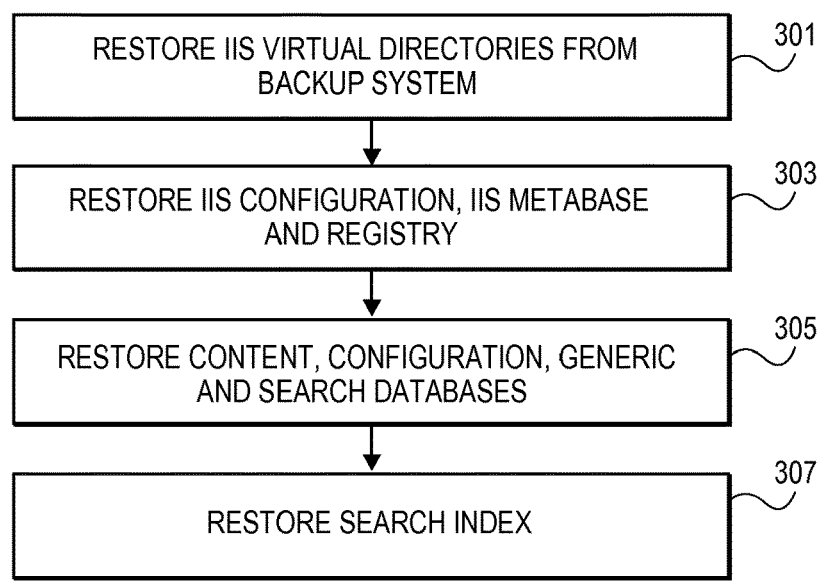
FIG. 3 is a flowchart of one embodiment of a restoration process for a web application platform server.

FIG. 3 is a flowchart of one embodiment of a restoration process for a web application server. In one embodiment, the restoration process can be initiated by the NMM at any point during the operation of the SharePoint server. In other scenarios, the restoration of SharePoint server be performed in response to a general failure or restart of the SharePoint server or based on any trigger defined by an administrator. The restoration process is described as it relates to the restoration of the SharePoint server. One skilled in the art would understand that the restoration process can also handle the restoration of other SharePoint related data.

The restoration process can begin by restoring the IIS virtual directories from the backup system (Block 301). The NMM can utilize the IIS virtual directories writer or similar module for restoring this data. The process can continue by restoring IIS configuration data, IIS metabase data and the registry data to the SharePoint system (Block 303). As used herein, 'restoring' data involves the reliable copying and transfer of the data from the backup system to the SharePoint server machine without affecting (i.e., without deleting or corrupting the data being restored). The NMM can utilize the respective modules that were used to obtain the data to restore the data. Thus, the NMM can use the registry module to restore the registry data, the IIS virtual directory module to restore the IIS virtual directory data, the IIS configuration writer to restore the IIS configuration data and the IIS metabase writer to restore the IIS metabase data.

The process can then restore the SharePoint databases to the SQL server (Block 305). The databases can be restored by the NMM via the SQL VSS writer or similar component that enables the SQL databases associated with the SharePoint Server to be accessed and restored from the data stored in the backup system. The backed up databases to be restored can include the search database, generic database, configuration database and content database.

The SharePoint server can be reassociated with the restored databases. Similarly, the SharePoint server can be restored to functionality and the use of the restored data by restoring the SharePoint search index (Block 307). The index file can be restored and reassociated with the SharePoint server by the NMM using the OSEARCH15 VSS writer.

Once all of the data for a selected SharePoint server has been successfully restored then the SharePoint server itself is restored to operation by the NMM.

In the description and claims, the terms "coupled" and/or "connected," along with their derivatives, have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

One or more embodiments include an article of manufacture (e.g., a computer program product) that includes a machine-accessible and/or machine-readable medium. The medium may include a mechanism that provides, for example stores or transmits, information in a form that is accessible and/or readable by the machine. The machine-accessible and/or machine-readable medium may provide, or have stored thereon, a sequence of instructions that if executed by a machine cause or result in the machine performing one or more operations, methods, or techniques disclosed herein.

In one embodiment, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

In another embodiment, the machine-readable media may include a non-tangible transitory machine-readable communication medium. For example, the transitory machine-readable communication medium may include electrical, optical, acoustical or other forms of propagated signals, such as carrier waves, infrared signals, digital signals, etc.)

Examples of suitable machines include, but are not limited to, computer systems, desktops, laptops, network elements, storage appliances, equipment of remote archive repositories, and other electronic devices, equipment, elements, or systems having one or more microprocessors. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more buses/interconnects and bridges (also termed bus controllers). Thus, the storage device of a given electronic device may store code and/or data for execution on the one or more processors of that electronic device.

It should also be appreciated that reference throughout this specification to "one embodiment," "an embodiment," or "one or more embodiments," for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method for backing up and restoring a web applications platform comprising:
    backing up, via a database volume shadow-copy service (VSS) writer, web applications platform databases to a backup system, wherein the database VSS writer enables access to the web applications platform databases, and wherein the web applications platform is a SharePoint server in a farm configuration;
    backing up via a search VSS writer a search index of the web applications platform, wherein the search index of the web applications platform includes search index information for associating the web applications platform with the web applications platform databases;
    in response to querying an application programming interface (API) to determine internet information services (IIS) virtual directories associated with the web applications platform, receiving the IIS virtual directories associated with the web applications platform, wherein the API provides access to the web applications platform;
    in response to receiving the IIS virtual directories associated with the web applications platform, backing up via an IIS virtual directory writer the IIS virtual directories associated with the web applications platform to the backup system;
    backing up IIS configuration data, IIS metabase data and registry data for the web applications platform to the backup system;
    restoring the IIS virtual directories of the SharePoint server from the backup system;
    restoring the IIS configuration data, the IIS metabase data, and the registry data from the backup system;
    subsequent to restoration of the IIS configuration data, the IIS metabase data, and the registry data, restoring the web applications databases to a structured query language (SQL) server from the backup system; and
    restoring the web applications search index from the backup system, wherein the restoration of a combination of the IIS virtual directories, the IIS configuration data, the IIS metabase data, the registry data, the web applications databases, and the web applications search index restores the SharePoint server in the farm configuration to a fully operational state.

2. The method of claim 1, wherein the web applications platform databases include a generic database, a content database, a search database and a configuration database.

3. A non-transitory computer-readable medium, having instructions stored therein, which when executed cause a computer to perform a set of operations comprising:
    backing up, via a database volume shadow-copy service (VSS) writer, web applications platform databases to a backup system, wherein the database VSS writer enables access to the web applications platform databases, and wherein the web applications platform is a SharePoint server in a farm configuration;
    backing up via a search VSS writer a search index of the web applications platform, wherein the search index of the web applications platform includes search index information for associating the web applications platform with the web applications platform databases;
    in response to querying an application programming interface (API) to determine internet information services (IIS) virtual directories associated with the web applications platform, receiving the IIS virtual directories associated with the web applications platform, wherein the API provides access to the web applications platform;

in response to receiving the IIS virtual directories associated with the web applications platform, backing up via an IIS virtual directory writer the IIS virtual directories associated with the web applications platform to the backup system;

backing up IIS configuration data, IIS metabase data and registry data for the web applications platform to the backup system, restoring the IIS virtual directories of the SharePoint server from the backup system;

restoring the IIS configuration data, the IIS metabase data, and the registry data from the backup system;

subsequent to restoration of the IIS configuration data, the IIS metabase data, and the registry data, restoring the web applications databases to a structured query language (SOL) server from the backup system; and restoring the web applications search index from the backup system, wherein the restoration of a combination of the IIS virtual directories, the IIS configuration data, the IIS metabase data, the registry data, the web applications databases, and the web applications search index restores the SharePoint server in the farm configuration to a fully operational state.

4. The non-transitory computer-readable medium of claim 3, wherein the web applications platform databases include a generic database, a content database, a search database and a configuration database.

5. A data processing system, comprising:
a processor; and
a memory coupled to the processor to store instructions, which when executed by the processor, cause the processor to perform a set of operations, the operations including
backing up, via a database volume shadow-copy service (VSS) writer, web applications platform databases to a backup system, wherein the database VSS writer enables access to the web applications platform databases, and wherein the web applications platform is a SharePoint server in a farm configuration, backing up via a search VSS writer a search index of the web applications platform, wherein the search index of the web applications platform includes search index information for associating the web applications platform with the web applications platform databases, in response to querying an application programming interface (API) to determine internet information services (IIS) virtual directories associated with the web applications platform, receiving the IIS virtual directories associated with the web applications platform, wherein the API provides access to the web applications platform, in response to receiving the IIS virtual directories associated with the web applications platform, backing up via an IIS virtual directory writer the IIS virtual directories associated with the web applications platform to the backup system, backing up IIS configuration data, IIS metabase data and registry data for the web applications platform to the backup system, restoring the IIS virtual directories of the SharePoint server from the backup system, restoring the IIS configuration data, the IIS metabase data, and the registry data from the backup system, subsequent to restoration of the IIS configuration data, the IIS metabase data, and the registry data, restoring the web applications databases to a structured query language (SQL) server from the backup system, and restoring the web applications search index from the backup system, wherein the restoration of a combination of the IIS virtual directories, the IIS configuration data, the IIS metabase data, the registry data, the web applications databases, and the web applications search index restores the SharePoint server in the farm configuration to a fully operational state.

6. The system of claim 5, wherein the web applications platform databases include a generic database, a content database, a search database and a configuration database.

* * * * *